May 19, 1964 — A. M. STOTT — 3,133,408
THRUSTER
Filed Feb. 15, 1962
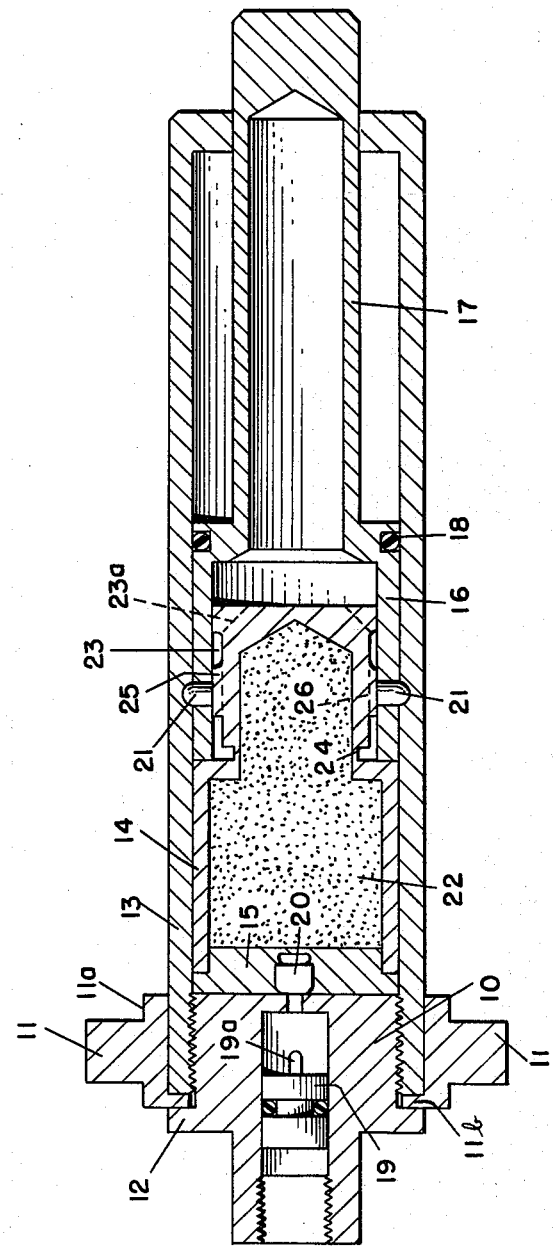
INVENTOR.
ALBERT M. STOTT

3,133,408
THRUSTER

Albert M. Stott, Aldan-Clifton Heights, Pa., assignor to the United States of America as represented by the Secretary of the Army
Filed Feb. 15, 1962, Ser. No. 173,593
6 Claims. (Cl. 60—26.1)
(Granted under Title 35, U.S. Code (1952), sec. 266)

The invention described herein may be manufactured and used by or for the Government for governmental purposes without the payment to me of any royalty thereon.

This invention relates to a thruster for unlocking an aircraft canopy and other uses. An object is to provide such a thruster which is safer, more nearly foolproof and not likely to become accidentally unlocked. Further objects include the provision of a thruster which is lighter in weight, smaller, of fewer parts, requires less time for machining its cylinder or outer casing, and possesses a tell-tale signal to indicate when an unfired cartridge is embodied in it.

Heretofore a thruster for such purposes has been of two general types. One such type has a spring and sleeve enabling a propellant actuated piston to have limited resilient movement relative to its cylinder or outer casing as has been thought desirable during a drop test on the projecting end of the piston. However in event of a higher than expected thrust axially and inward, the piston becomes unlocked from its cylinder and there is nothing on the outside to show that unlocked condition especially if the piston is connected to whatever is to be moved. An unlocked condition for the canopy of an aircraft is very serious because the canopy may blow away prematurely rendering the plane and its crew incapacitated.

The other type has a shear pin locking the piston and outer casing. While having no yieldable piston with its disadvantage, the shear pin may nevertheless get prematurely partially sheared with the result that after a drop test or accident the lock is not as strong as was supposed so that less than an anticipated thrust may unlock the load.

The present invention eliminates these aforementioned disadvantages and meets all the requirements set forth in the foregoing objects of the present invention.

Referring to the single figure of the drawing there is shown a longitudinal section through a preferred embodiment of this invention.

A firing head 10 containing some firing means for a cartridge is threaded or otherwise connected to a cylindrical body portion 13 of the thruster. A pair of supporting trunnions 11 are rotatably mounted on said body portion 13 by a ring 11a having a flange 11b extending between a peripheral flange 12 on said head 10 and an end portion of said body portion 13 with a small longitudinal clearance of about .003 to .005 of an inch. Some freedom of circumferential movement of the trunnions and their ring 11a is also present. A cartridge case 14 has its rear end closed by a head 15 secured to the case in any convenient manner. In front of and contiguous to the case 14 is a piston 16 and piston rod 17 slidable within the cylinder 13 and sealed by means of an O-ring packing 18. A firing pin 19 likewise carries an O-ring for movement in response to fluid pressure from some appropriate source. A forward end 19a of the firing pin 19 is of a size to enter an opening 19b in the forward face of the head 10 to enable this pin 19 to engage and fire the usual percussion primer 20 for firing propellant 22 in the case 14.

Locking keys 21 (preferably 4 or more of them equally angularly spaced) extend through the piston 16 into a peripheral recess in the inner face of the cylinder 13. These keys 21 are held in their locked position by engagement with lands 25 between which are narrow grooves, their depth being shown by the dotted horizontal lines 26 below the outer surface of the lands 25. As shown in the drawing a forward portion of the case 14 containing lands 25 is of smaller diameter than is the main body portion and is connected therewith by a frangible portion 24 of about .025 of an inch thickness and adapted to rupture under about 1000 pounds per square inch of propellant pressure. Under rearward pressure against the case head 15 the case portion ahead of the ruptured portion 24 moves forward with piston 16. The break at 24 enables propellant pressure to pass through the grooves between the lands 25 into the hollow piston having its front end closed as shown. These grooves extend to the front face of the case 14. The dotted inclined lines 23a indicate the bottom of the forward ends of these grooves. The forward end of the cylinder 13 is not sealed around the piston and air that leaks in around the piston rod 17 can with equal facility be pushed out of the space around the piston rod within cylinder 13.

In assembling this thruster the cartridge case 14 is moved into the piston 16 while both are outside of the cylinder and with the keys 21 within the piston and supported in peripheral recess 23. As the case 14 is moved forward these keys 21 are in the peripheral recess 23 for insertion of both case 14 and piston 16 into the cylinder. With these keys 21 based in recess 23 and extending through but not yet extending radially outside of the inside diameter of the cylinder 13, the keys 21 thus retain the case and piston together in the assembling operation. As the case and piston are moved into the cylinder 13, the piston rod may be held stationary at a mark on the forward end thereof when the keys 21 are longitudinally alined with peripheral recess in the inner face of the cylinder 13 into which the keys are to extend. Then holding piston fixed the case 14 is moved slowly further into the piston. The inclined end of the lands constituting the rear wall of recess 23 causes these locking keys to be raised until they enter the recess in the cylinder and are resting on the outer surface of the lands 25. The firing head 10 may then be moved into place as illustrated.

Among the advantages of this invention may be mentioned the fact that thruster is safer because the piston 16 is locked with respect to the cylinder 13 until the cartridge has been fired. There is no spring or sleeve and no longer any chance that the spring may be omitted or stressed enough to unlock the piston before firing. The thruster is simpler, more compact and lighter in weight for a given size, the smooth cylindrical surface of only one diameter on which the trunnion ring rests is easier to machine than have the prior thrusters having a cylinder of less simple contour. The frangible connection 24 holds the piston locked in the cylinder. The locking keys are of a larger size than a shear pin and are not likely to be prematurely deformed. The fact that connection 24 has not been broken serves as a tell-tale indicator that an unfired cartridge is in place because if it has been fired the piston and piston rod would not be locked in place and the rounded side walls of the peripheral recess in the cylinder 13 in which the keys 21 are shown are capable of assisting the keys to be moved radially inwardly out of the way. The inclined camming surface constituting the rear wall of recess 23 is preferably not more than 45° inclination to the longitudinal axis of piston, case, and cylinder and desirably less than such 45°.

The operation is as follows, when fluid under pressure is applied to the firing pin 19 it is projected forward enabling the forward end 19a to enter the opening 19b in the forward face of the head 10 firing the percussion primer 20, which, in turn, causes the propellant charge to ignite. Pressure generated by the burning propellant causes the cartridge case 14 to separate or rupture at its frangible portion 24. When the cartridge case separates, the separated forward end moves axially away from the initially locked position and toward the piston rod 17. The lands 25 are moved away from the keys 21, subjecting the keys to a reduced diameter portion of the forward end of the cartridge case. The propellant pressure acts on the keys which are cammed radially inwardly by the peripheral recesses in the cylinder body causing them to be released from the recesses. The piston 16 is unlocked from the body portion 13 of the thruster rendering the piston free to move axially forward under the force of the propellant gases.

I claim:

1. In a thruster comprising a cylindrical body, a piston and piston rod, a cartridge case in said body, said cartridge case being closed at the end facing said piston rod, said piston and piston rod being movable by gas pressure from said cartridge case, a propellant within said cartridge case, and means for firing said propellant, the combination therewith of the improvement for holding the piston locked with respect to said cylindrical body until the propellant has been fired whereby the danger of the thruster being prematurely unlocked is reduced and said thruster is simplified in construction and reduced in weight, said improvement including a frangible portion of said cartridge case adjacent said piston, said frangible portion being defined by a circumferentially thinned wall between the ends of said cartridge case, a locking key supported by the portion of said cartridge case forward of said frangible portion and engaging walls of a recess in said piston and said cylindrical body, said cartridge case portion forward of said frangible portion being movable axially relative to said piston after rupture of said frangible portion from gas pressure from said cartridge case to a position where the locking key may be cammed radially inward by the recess in said cylindrical body, whereby said piston is positively locked to said cylindrical body until after rupture of said frangible portion from said cartridge case on firing said propellant.

2. A thruster according to claim 1 including a cartridge case having said cartridge case portion forward of said frangible portion of a smaller diameter than the remainder of said cartridge case.

3. A thruster according to claim 2 in which locking key is constituted by a plurality of keys equally angularly spaced.

4. A thruster according to claim 3 in which each key is contiguous to a plurality of lands between which are fluid pressure grooves for propellant pressure entering said piston.

5. A thruster according to claim 4 in which a forward end of each land is inclined at an angle of not more than about 45° to a longitudinal axis of the case, piston, and cylinder.

6. A thruster according to claim 5 in which said case is of uniform outside diameter and is provided a pair of opposite trunnions projecting from a ring rotatable on said cylinder.

References Cited in the file of this patent

UNITED STATES PATENTS

| 2,213,435 | Temple | Sept. 3, 1940 |
| 2,845,002 | Ackerman | July 29, 1958 |
| 2,925,011 | Musser | Feb. 16, 1960 |
| 2,926,638 | Magnus | Mar. 1, 1960 |

FOREIGN PATENTS

| 979,155 | France | Dec. 6, 1950 |